(12) United States Patent
Haddad

(10) Patent No.: US 9,077,241 B2
(45) Date of Patent: Jul. 7, 2015

(54) DC/DC CONVERTER CELL AND CIRCUIT WITH FEEDBACK CAPABILITY, AND METHOD FOR ITS OPERATION

(75) Inventor: Kevork Haddad, Newark Valley, NY (US)

(73) Assignee: Semikron Elektronik GmbH & Co., KG, Nürnberg (DE)

(*) Notice: Subject to any disclaimer, the term of this patent is extended or adjusted under 35 U.S.C. 154(b) by 412 days.

(21) Appl. No.: 13/405,228

(22) Filed: Feb. 24, 2012

(65) Prior Publication Data

US 2012/0217943 A1  Aug. 30, 2012

Related U.S. Application Data

(60) Provisional application No. 61/447,399, filed on Feb. 28, 2011.

(51) Int. Cl.
*G05F 1/563* (2006.01)
*H02M 3/158* (2006.01)
*H02M 1/00* (2007.01)

(52) U.S. Cl.
CPC ...... *H02M 3/158* (2013.01); *H02M 2001/0077* (2013.01); *Y02E 10/56* (2013.01)

(58) Field of Classification Search
CPC ............................. G05F 1/618; H02M 3/1584
USPC .......... 323/222, 224, 225, 266, 271, 282, 351
See application file for complete search history.

(56) References Cited

U.S. PATENT DOCUMENTS

| 5,844,399 | A  | * | 12/1998 | Stuart ........................... 323/282 |
| 6,798,177 | B1 | * | 9/2004  | Liu et al. ........................ 323/222 |
| 7,812,575 | B2 | * | 10/2010 | Shimada et al. ............... 323/222 |
| 7,839,255 | B2 | * | 11/2010 | Nagano et al. ................ 336/221 |
| 7,952,332 | B2 | * | 5/2011  | Chojecki et al. .............. 323/222 |
| 8,212,537 | B2 | * | 7/2012  | Carpenter et al. ............. 323/225 |
| 8,350,540 | B2 | * | 1/2013  | Cuk .............................. 323/232 |
| 8,749,210 | B1 | * | 6/2014  | Nakao et al. .................. 323/225 |
| 2007/0296383 | A1 |   | 12/2007 | Xu et al. |
| 2009/0206804 | A1 |   | 8/2009  | Xu et al. |
| 2011/0304214 | A1 | * | 12/2011 | Haddad ........................... 307/82 |
| 2012/0217943 | A1 | * | 8/2012  | Haddad ........................ 323/282 |

FOREIGN PATENT DOCUMENTS

DE   10 2009 008072   8/2010

OTHER PUBLICATIONS

EP Search report in corresponding case, Jun. 25, 2012.

* cited by examiner

*Primary Examiner* — Jeffrey Sterrett
(74) *Attorney, Agent, or Firm* — The Law Offices of Roger S. Thompson

(57) ABSTRACT

A DC/DC converter circuit having feedback capability with a first converter device whose two inputs form the inputs of the DC/DC converter circuit and can be connected to a DC voltage source. The DC/DC converter circuit has a DC voltage-coupled second converter device whose outputs form the outputs of the DC/DC converter circuit and can be connected to a DC voltage sink, wherein the second converter device is in the form of a DC/DC converter cell or of a DC/DC converter cell arrangement having two DC/DC converter cells.

11 Claims, 4 Drawing Sheets

DC/DC CONVERTER CELL AND CIRCUIT WITH FEEDBACK CAPABILITY, AND METHOD FOR ITS OPERATION

PRIORITY CLAIM

Applicant hereby claims priority from the prior-filed provisional application Ser. No. 61/447,399, filed Feb. 28, 2011.

BACKGROUND OF THE INVENTION

1. Field of the Invention

The invention is directed to a DC/DC converter circuit with feedback capability for connection to a DC voltage source and a DC voltage sink, wherein the preferred energy transport takes place from the DC voltage source to the DC voltage sink. As used herein, the term "with feedback capability" also describes the opposite path and, therefore, the DC/DC converter circuit can also transport energy from the DC voltage sink to the DC voltage source. Furthermore, the invention is also directed to an advantageous method for operation of such a DC/DC converter circuit.

2. Description of the Related Art

DC/DC converter circuits such as described, DC/DC converter cell arrangements which inter alia form them, and DC/DC converter cells which form them are in general used for voltage matching of the output voltage of a DC voltage source whose output voltage may vary over time to a DC voltage sink at a voltage level which is constant over time and is, in general, higher than the voltage source.

DC voltage sources of this type may be, for example, photovoltaic systems or subsystems thereof, fuel cells or storage elements such as rechargeable batteries or capacitor circuits. The various functional parameters are typical for the various types of DC voltage sources. While photovoltaic systems are essentially characterized in that their output voltage may be subject to major fluctuations, fuel cells are characterized by a relatively constant voltage output. Various storage elements have a generally constant output voltage, although this is naturally limited over time, referred to in a better form here as terminal voltages.

DC voltage sinks may be the input of an inverter circuit arrangement or a DC bus system. A DC bus system typically has a plurality of DC/DC converter systems of the same type or in different forms connected to them, with DC voltage sources connected to them, which either feed the DC bus system, or are fed from it. Accounting for line losses, it is frequently advantageous to choose the voltage level of the DC bus system to be considerably higher than the output voltage of at least most of the connected DC voltage sources.

SUMMARY OF THE INVENTION

It is therefore an object of the invention to provide a universal DC/DC converter topology for bidirectional connection, that is to say a connection with feedback capability, of DC voltage sources which preferably have a variable terminal voltage to a DC voltage sink which preferably has a constant terminal voltage.

Briefly stated, there is provided a DC/DC converter cell for conversion of a DC voltage, which is applied to the input connections, at a first voltage level to a DC voltage, which is then produced at the output connections, at a second voltage level. By way of example, a DC/DC converter cell such as this is used for matching the output voltage of a photovoltaic system or of a system part thereof, at a first voltage level which varies over time to the inputs of an inverter with a DC voltage at a second, constant voltage level. This DC/DC converter cell advantageously has feedback capability, that is to say it can operate bidirectionally, in order, by way of example, to charge a storage element to a voltage level which is likewise constant but is lower, from a DC bus system at a constant voltage level. The DC bus system may, of course, likewise be fed from the storage element again.

The inventive DC/DC converter cell has three input connections and two output connections. The DC voltage source can be connected to two of the three input connections such that it is connected to the first input connection and the second input connection, or to the second input connection and the third input connection. When the DC voltage source is connected, it may be advantageous to ground one of the two input connections. It may likewise be advantageous to provide an input capacitor between the two input connections which are connected to the DC voltage source. Of the two output connections, the first is connected to the first input connection, and the second is connected to the third input connection of the DC/DC converter cell. Furthermore, the two output connections can be connected to a DC voltage sink, wherein, in this case as well, it is advantageously possible to provide an output capacitor between the two output connections.

Furthermore, the DC/DC converter cell has at least one converter stage, but advantageously a plurality of converter stages of the same type. Each converter stage has an upper series circuit and a lower series circuit, each having at least two power switches. In accordance with the known prior art, these power switches may each be in the form of power transistors, by way of example IGBTs with freewheeling diodes connected back-to-back in parallel, or MOSFETs.

The second input connection of the DC/DC converter cell is connected to the center point of each of the at least one converter stages, preferably by an intermediate coil. The center point splits the respective converter stage symmetrically into the upper series circuit and the lower series circuit. Order numbers from 1 to N−1 are assigned to the respective transistors in the two series circuits, in each case counting from the center point. The last of the upper power switches, that with the order number N−1, is connected to the first input connection, while the last of the lower power switches, likewise that with the order number N−1, is connected to the third input connection.

Furthermore, at least one capacitor is provided in each of the at least one converter stages. The respective capacitor likewise has an order number. The capacitor for one order number is connected on the one hand to the center point between the upper power switch with the same order number and that with the order number following this, and on the other hand to the center point between the lower power switch with the same order number and that with the order number following this. Viewed from the center point of the respective converter stage, this therefore results in a symmetrical arrangement of N−2 capacitors.

Viewed results in N from the potential center levels point, this therefore in each converter stage, the first of which levels forms the center point itself, and the last of which forms the first and third input connections, while the central ones are formed by the center points between the power switches. An arrangement in each case having four power switches in the upper and lower series circuits therefore has three capacitors and five potential levels, and is therefore referred to as a five-level circuit.

This refinement of a DC/DC converter cell has the advantageous feature that each of the N−1 power switches in each series circuit need only have a withstand strength of 1/(N−1)-times the output voltage of the DC/DC converter cell. In the case of step-up conversion, the ripple on the output current can be reduced by the DC/DC converter cell as the number of levels increases, by suitable control of the power switches, in particular by offset clocking, therefore reducing the capacitance of an output capacitor that has to be provided, by the respective factor.

A DC/DC converter cell arrangement has two of the DC/DC converter cells as just described, wherein the third input connection of the first DC/DC converter cell is connected to the first input connection of the second DC/DC converter cell, and the second output connection of the first DC/DC converter cell is connected to the first output connection of the second DC/DC converter cell, and the respective connections correspond.

The second input connections of each of the two DC/DC converter cells form the inputs of the converter cell arrangement. A coil as described above for the DC/DC converter cell is advantageously provided at at least one input of the converter cell arrangement. When one coil is provided in each of the two inputs of the DC/DC converter cell arrangement, it may also be advantageous for these two coils to be coupled magnetically, that is to say by transformer action.

The first output connection of the first DC/DC converter cell and the second output connection of the second DC/DC converter cell form the two outputs of the DC/DC converter cell arrangement. However, it may also be advantageous for the second and first output connections which are connected to one another in the first and the second DC/DC converter cells to be provided as an additional output of the DC/DC converter cell arrangement. By way of example, this additional output may be used to balance the output voltage and may advantageously be grounded, if neither of the two inputs of the DC/DC converter cell arrangement is at ground potential.

For the requirements mentioned above, in particular in the case of DC voltage sinks in the form of a DC bus system, a DC/DC converter circuit having feedback capability and consisting of two converter devices is particularly advantageous when the voltage levels of the DC voltage source and the DC voltage sink differ by approximately one order of magnitude or more, that is to say by a factor of about 10.

It may likewise be advantageous to connect two such DC/DC converter circuits with a feedback capability which is analogous to the connection, as described above, of two DC/DC converter cells to form a DC/DC converter cell arrangement.

In this case, the first converter device may be designed according to the known prior art and may consist of one stage or of a plurality of stages connected in series. Each such stage may consist of a half-bridge circuit, wherein the center contact of the at least one stage forms one of the two respective inputs of the DC/DC converter circuit. It is preferable to provide a coil in each case between the input of the DC/DC converter circuit with a feedback capability and the associated center contact of the first converter device. These coils can advantageously be coupled to one another by way of a transformer.

The second converter stage is in the form of a DC/DC converter cell or of a DC/DC converter cell arrangement as described above.

The DC voltage coupling between the first and the second converter circuits is formed by the connection of the outputs of the first converter device to the inputs of the second converter device, in which case it may be preferable to provide a coil in at least one of these connections.

However, coils such as this can be dispensed with, or it can be provided with a particularly low inductance in accordance with conventional design rules, if the DC/DC converter circuit is operated in a particularly advantageous manner.

This particularly advantageous method of operation is distinguished in that, in the step-up converter mode, that is to say when the voltage level at the input of the DC/DC converter circuit is lower than the desired voltage level at the output, the first converter device continuously increases the output voltage of the voltage level of the DC voltage source by a maximum of a factor of three, while the second converter circuit carries out the output voltage of the first converter circuit exclusively by constant, preferably integer, factors.

When the voltage is increased exclusively by integer factors, the power switches in the DC/DC converter cells which form the second converter device are switched such that no energy, or only a very small amount of energy, need be stored in the connection between the first and the second converter device. There is therefore no need whatsoever to arrange a coil there, or this can be provided at least with a considerably lower inductance than that according to the known design rules.

An advantage such as this is also achieved with further preferred, non-integer but constant, factors for the voltage increase in combination with a suitable number of power switches in each case in the upper and lower series circuits, specifically dispensing completely with the coil or else providing them with a considerably lower inductance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 4b illustrates a detail of a section of FIG. 4a;

FIG. 8a illustrates a further embodiment of a DC/DC converter circuit with a feedback capability.

DETAILED DESCRIPTION OF THE PRESENTLY PREFERRED EMBODIMENTS

Figure 1:
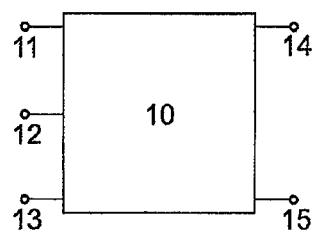
FIG. 1 schematically illustrates a DC/DC converter cell.

FIG. 1 schematically illustrates a DC/DC converter cell 10 having three input connections 11, 12, 13 and two output connections 14, 15. Converter cell 10 forms, so to speak, the basic module or the basic component of all the further following circuits.

Figure 2:
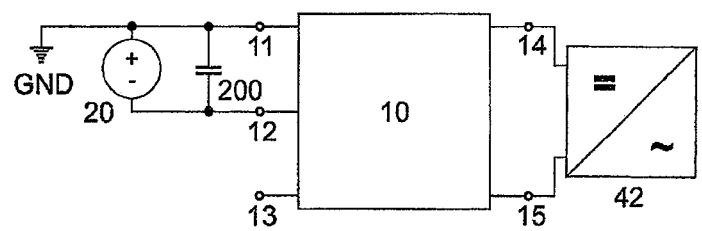
FIGS. 2 and 3 each illustrate a DC/DC converter cell with different connection variants.
Figure 3:
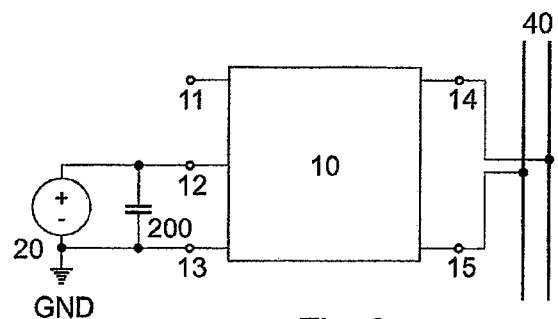

FIGS. 2 and 3 each illustrate a DC/DC converter cell 10 with various connection variants. FIG. 2 illustrates a DC voltage source 20 with a positive and a negative pole. The positive pole is connected to first input connection 11 of DC/DC converter cell 10 while the negative pole is connected to second input connection 12 of DC/DC converter cell 10. The figures also show the advantageous connection of one input connection, in this case first input connection 11, to ground potential GND. Connections such as these to ground potential GND are frequently normal practice in a DC voltage source for photovoltaic systems.

Furthermore, and independently of the connection to ground GND, input connections 11, 12 are connected in a preferred manner to an input capacitor 200. In the case of DC voltage sources 20 with a given ripple on the output voltage, input capacitor 200 can be used to smooth this output voltage. However, input capacitor 200 can also be used as a short-term energy store if the output voltage from DC voltage source 20 is not available continuously.

Outputs 14, 15 of DC/DC converter cell 10 are in this case connected, by way of example, to an inverter 42 as a DC voltage sink.

FIG. 3 shows further advantageous external circuitry for a DC/DC converter cell 10. In this case, the positive pole of the DC voltage source 20 is connected to second input connection 12 of DC/DC converter cell 10, while the negative pole is connected to third input connection 13. By way of example, it may likewise be advantageous in this case to connect the negative pole of the DC voltage source and/or third input connection 13 of the DC/DC converter cell to ground GND.

The outputs of DC/DC converter cell 10 are connected to a DC bus system 40. Within a photovoltaic system by way of example, DC bus system 40 such as this connects a plurality of subsystems to one another and possibly to an inverter. When a decentralized power generating device is used with a DC bus system 40 such as shown, a plurality of DC voltage sources 20 of different forms can likewise be connected to one another. By way of example, this plurality of pure DC voltage sources may be, for example, photovoltaic modules or fuel cells, or DC stores, such as capacitors.

DC/DC converter cell 10 described here is not only able to transport energy from DC voltage source 20 to DC voltage sink 40, 42, but is also suitable for transporting energy in the opposite direction, by way of example, for feeding capacitor devices as a DC voltage source. In this case, the voltage level of DC voltage sink 40, 42 is normally reduced, and is fed into DC voltage source 20. This describes the feedback capability of DC/DC converter cell 10.

Figure 4A:
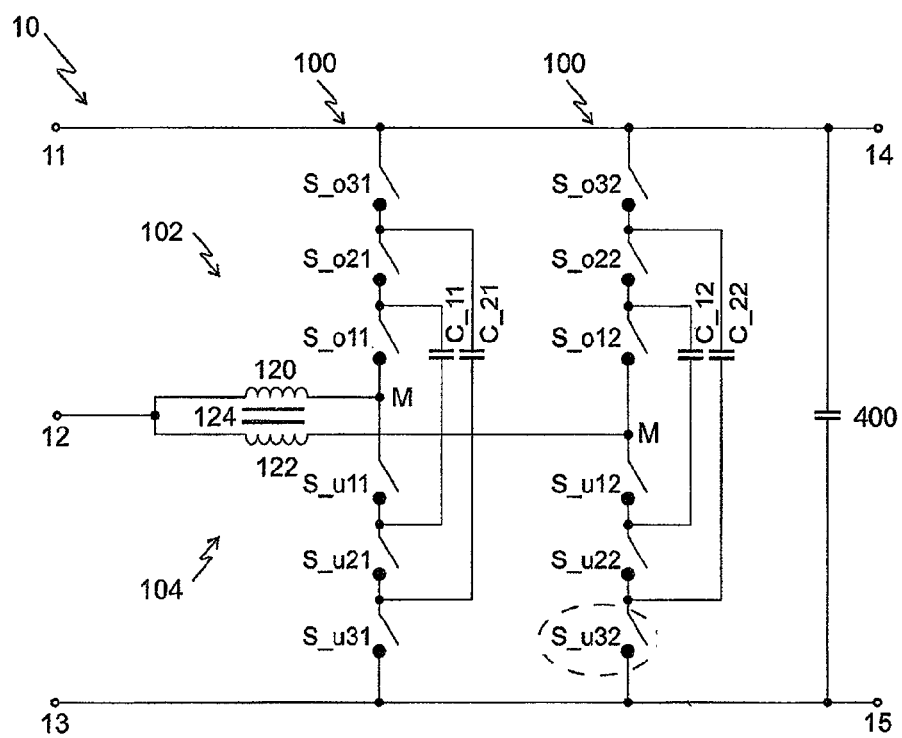
FIG. 4a illustrates one embodiment of a circuit for a DC/DC converter cell.

FIG. 4a shows one embodiment of a circuit of a DC/DC converter cell 10 having the functionality described under FIG. 3. The illustration shows the three input connections 11, 12, 13, as well as two output connections 14, 15. First input connection 11 is in this case connected directly to first output connection 14, and third input connection 13 is likewise connected directly to second output connection 15.

The converter functionality is formed by two converter stages 100 in this case, although any desired number is possible, depending on the power. A converter stage 100 consists of an arrangement which is symmetrical with respect to a center point N of an upper series circuit 102 and a lower series circuit 104, each comprising a plurality of power switches $S\_ox1$, $Sux2$, $S\_ox2$, $S\_ux2$. The center point M of this symmetrical arrangement is in each case connected to second input connection 12 of DC/DC converter cell 10. In this refinement, a coil 120, 122 is in each case provided between the second input connection 12 and the respective center point M. In this case, it may also be advantageous to magnetically couple coils 120, 122 by a common core 124. A coupling such as this may also be referred to as a transformer coupling.

Figure 4B:
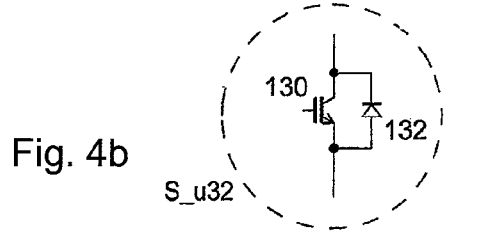

Upper series circuit 102 and lower series circuit 104 of a converter stage 100 consists of at least two, in this case three, power switches $S\_ox1$, $S\_ux2$, $S\_ox2$, $S\_ux2$, which are in the form of power transistors, for example IGBTs 130 with a freewheeling diode 132 connected back-to-back in parallel (see, FIG. 4b), or may be in the form of MOSFETs with an intrinsic freewheeling diode. Each of the power switches $S\_ox1$, $S\_ux2$, $S\_ox2$, $S\_ux2$ has an associated order number x, counted from the center point of the converter stage, starting from one. The second character y in this case defines the respective converter stage.

Furthermore, capacitors $C\_x1$, $C\_x2$ are provided in converter stage 100 depending on the number of power switches, in which case the number of capacitors is one less than the number of power switches in each series circuit 100. In the illustrated variant with three power switches in each series circuit, this therefore results in two capacitors. In the case of an embodiment in the form of a seven level DC/DC converter cell, with six power switches in each series circuit, which is likewise advantageous but is not illustrated, five capacitors would have to be provided.

Capacitors $C\_x1$, $C\_x2$ are provided such that the first connection of the first capacitor $C\_1y$ is in each $S\_o1y$ series each $S\_u1y$ series case connected between the first power switch and the second power switch $S\_o2y$ in an upper circuit 102, and its second connection is in case connected between the first power switch and the second power switch $S\_u2y$ in a lower circuit 104. In the case of an embodiment with four power switches circuit, which is not illustrated here, a third capacitor would be connected in the upper series circuit between the third and the fourth power switches, and likewise in the lower series circuit between the third and the fourth power switches. The important factor is therefore that one capacitor connection is provided between each two adjacent power switches, and that this respective capacitor is connected symmetrically between the upper and the lower series circuits.

Furthermore, it may be advantageous to connect two output connections 14, 15 of DC/DC converter cell 10 to a further capacitor, the output capacitor 400.

If DC/DC converter cell 10 did not need to have a feedback capability, individual power switches could be replaced by electrical valves, that is by diodes, in accordance with routine knowledge in the art and dependent on the external circuitry.

Figure 5:
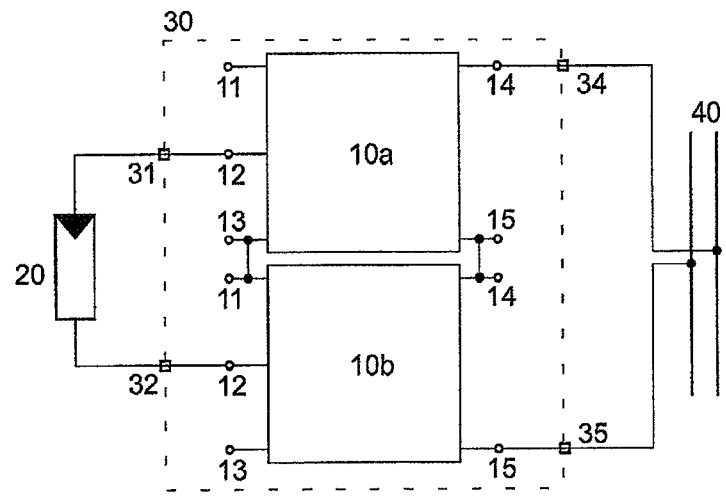
FIG. 5 schematically illustrates a DC/DC converter cell arrangement with external circuitry.

FIG. 5 schematically illustrates a DC/DC converter cell arrangement 30 with external circuitry. DC/DC converter cell arrangement 30 consists of two DC/DC converter cells 10 a/b which are connected to one another. For this purpose, third input connection 13 of first DC/DC converter cell 10a is connected to first input connection 11 of second DC/DC converter cell 10b. Second output connection 15 of first DC/DC converter cell 10a is likewise connected to first output connection 14 of second DC/DC converter cell 10b, necessarily by the internal connection within the respective DC/DC converter cell 10 a/b.

First input connection 11 of first DC/DC converter cell 10a, in the same way as third input connection 13 of second DC/DC converter cell 10b, do not form external connections of DC/DC converter cell arrangement 30 any more than the connected input connections of the respective converter cells as described above.

In fact, the two inputs 31, 32 of DC/DC converter cell arrangement 30 are formed from two second input connections 12 of the respective DC/DC converter cells 10 a/b and are in this case connected to a DC voltage source 20, which is in the form of a photovoltaic module. Outputs 34, 35 of DC/DC converter cell arrangement 30 in this embodiment are connected to a DC bus system 40, although they can likewise be connected directly to an inverter.

Figure 6:
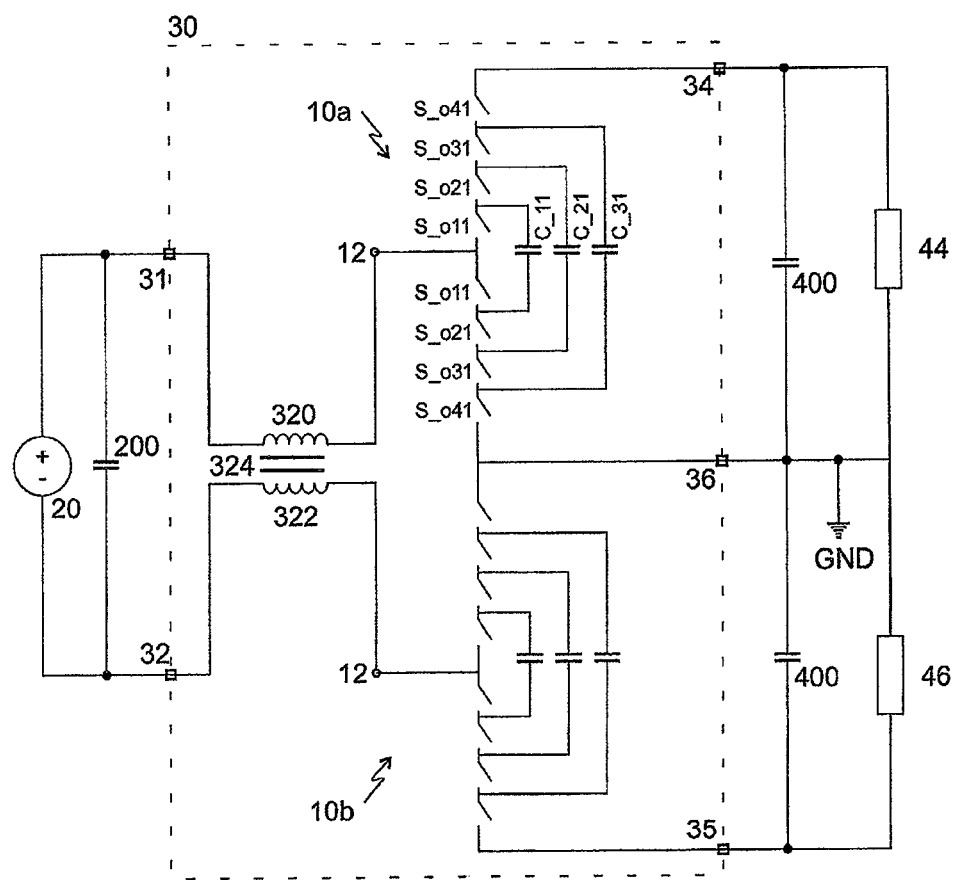
FIG. 6 illustrates one embodiment of a circuit of a DC/DC converter cell arrangement.

FIG. 6 shows a 5-level embodiment of a circuit of a DC/DC converter cell arrangement 30. DC/DC converter cells 10 *a/b* which form DC/DC converter cell arrangement 30 in this case each has only one stage, which is itself formed by one upper and one lower series circuit of four power switches S_o11 to S_o41, S_u11 to S_u41 which are connected to three capacitors C_11 to C_13 in the manner described above in each stage.

A respective coil 320, 322 is provided here downstream from inputs 31, 32 of DC/DC converter cell arrangement 30, in which case, two coils 320, 322 are once again not necessarily magnetically coupled, but are advantageously coupled by means of a common core 324. A DC voltage source 20 is connected to inputs 31, 32 such that its positive pole is connected to that input 31 of DC/DC converter cell arrangement 30 which corresponds internally to second input connection 12 of first DC/DC converter cell 10*a*. Analogously to this, the negative pole of DC voltage source 20 is connected to input 32 of DC/DC converter cell arrangement 30, which corresponds internally to second input connection 12 of second DC/DC converter cell 10*b*. Furthermore, an input capacitor 200 having a functionality as already described above with reference to FIG. 2, is provided between inputs 31, 32 of DC/DC converter cell arrangement 30.

In this embodiment, an additional further output 36, which is advantageous for certain applications, is illustrated for DC/DC converter cell arrangement 30, producing the potential of second output connection 15 of first DC/DC converter cell 10*a*, and therefore also that of first output connection 14 of second DC/DC converter cell 10*b*. This potential may be used as a DC voltage sink, balancing a load 44, 46 which is arranged at outputs of DC/DC converter cell arrangement 30, and may also be at ground potential GND.

Figure 7:
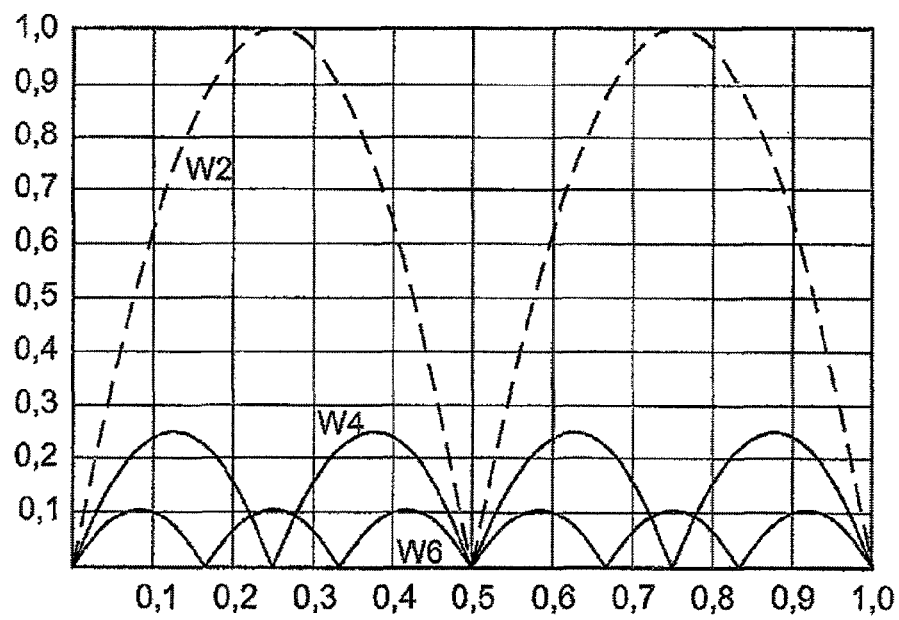
FIG. 7 illustrates a simulation of the relative ripple on the output voltage of various DC/DC converter cell arrangements.

FIG. 7 shows a simulation of the relative ripple on the output voltage of various embodiments of DC/DC converter cell arrangements, in comparison to the prior art. The illustration in this case shows the ripple W2 of a known converter circuit with a half-bridge circuit as a converter stage, as a relative ripple value of unity. In contrast, a 5-level DC/DC converter cell arrangement with four power switches in each upper and lower series circuit reduced the normalized ripple value W4 to about 0.25, while six power switches in each upper and lower series circuit in a 7-level converter cell arrangement reduce the normalized ripple value W6 to only a little above 0.1.

It is evident from this that the DC/DC converter cell arrangement, and the DC/DC converter cells proposed here, significantly reduces or reduce the ripple on the output voltage as the number of power switches in each upper and lower series circuit rises. At the same time, the coils which may need to be provided at the inputs can be provided with a low inductance, in comparison to known design rules. The circuitry complexity with a greater number of power switches results in better signal quality and lower costs for the additional circuitry.

Figure 8:
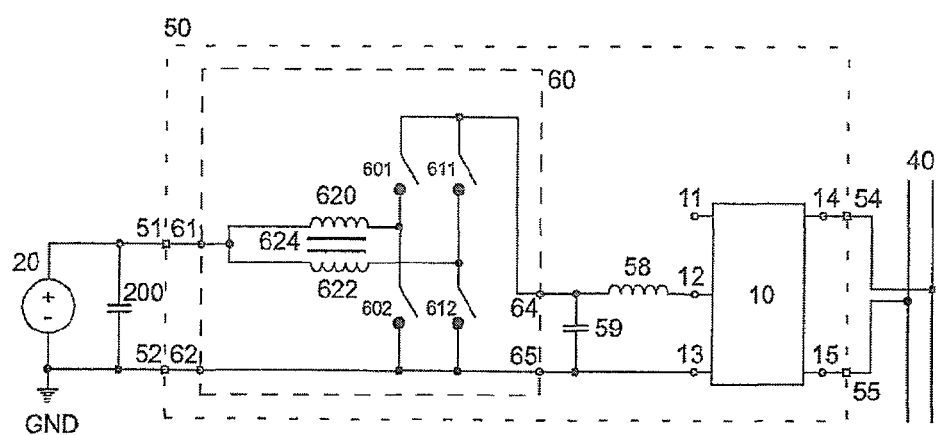
FIG. 8 illustrates a DC/DC converter circuit with a feedback capability.

FIG. 8 shows a DC/DC converter circuit 50 with a feedback capability, consisting of a first converter device 60 and a second converter device 10, with the first converter device being designed according to the prior art to produce a minor increase in the input voltage to DC/DC converter circuit 50 by a maximum of a factor of about three, but preferably by a factor of only about two. This first converter device 60 is connected by DC voltage coupling to the second, that is to say the first converter device produced an output DC voltage at its outputs 64, 65. This output DC voltage is used as an input DC voltage for second converter device 10. Depending on the method of operation of two converter devices 50, no coil 58 (as seen in FIG. 8*a*) or an additional coil 58 at least in one line, is provided as part of this DC voltage connection. An additional capacitor 59 can likewise be provided between the two poles of this DC voltage connection.

Second converter device 10 is formed by a DC/DC converter cell as described above or by a DC/DC converter cell arrangement, although this is not illustrated.

A DC voltage source is connected in a known manner to the input 51, 52 of the DC/DC converter circuit with a feedback capability, with the positive pole being connected to the center point of the respective stages of the first converter device via its first input 61, while the negative pole is connected to the second input 62 of the first converter device 60 and, via its output 65, to third input connection 13 of DC/DC converter cell 10. Furthermore, one of the two inputs 51, 52 of the DC/DC converter circuit 50, in this case the second input 52, that of the negative pole, may be at ground potential GND. Independently of this, an input capacitor 200 can also be provided between the two poles of DC voltage source 20 and between inputs 51, 52 of DC/DC converter circuit 50.

Once again without any restriction to generality, a DC bus system 40 in the form described above is provided at the outputs 54, 55 of DC/DC converter cell 50 with a feedback capability.

Exemplary values, which may originate from an arrangement with a photovoltaic system, would be an input voltage to DC/DC converter circuit 50, that is to say at the output of DC voltage source, of about 125 V to about 300 V, a desired output voltage at the DC/DC converter circuit to the DC bus system of about 1500 V, and a conversion power of about 125 kW. In this case, it is obvious that, in the case of an input current of up to about 1000 A and with knowledge of currently available power semiconductor modules, a multi-stage embodiment of both the first and the second converter device is advantageous and preferable.

Advantageously, the DC/DC converter circuit with a feedback capability is operated such that the first converter device raises the input voltage to about 300 V, and the second converter device multiplies this value by a constant factor of about five. In this case, it is advantageous for this second converter device to be in the form of a 6-level DC/DC converter cell with five power switches in each upper and lower series circuit. In this embodiment and using this method, it may be possible to dispense with the presence of any further components, in particular of coils, between the outputs of the first converter device and the inputs of the second converter device.

If the second converter cell is in the form of a DC/DC converter cell, the entire DC/DC converter circuit can also be developed unambiguously to the embodiment of the DC/DC converter cell arrangement as described above to form a DC/DC converter circuit with a feedback capability. For this purpose, a second DC/DC converter circuit is added to a DC/DC converter circuit, at its negative potential, unambiguously to the above description.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a DC/DC converter circuit having a feedback capability and including a first converter device, the first converter including at least two inputs which form inputs of the DC/DC converter circuit, and are configured to be connected to a DC voltage source, the DC/DC converter circuit further having a DC-voltage coupled second converter device whose outputs form outputs of the DC/DC converter circuit and are configured to be connected to a DC voltage sink, wherein the second converter device comprises a DC/DC converter cell,
   wherein in a step-up converter mode, the first converter device continuously increases a voltage value of the DC voltage source by a maximum of a factor of about three, while the second converter circuit carries out the output voltage of the first converter circuit by a further constant factor; and
   wherein the first converter circuit includes at least two stages connected in series, wherein the at least two stages are configured to be connected to the DC voltage source via at least one coil.

2. The method of claim 1, wherein the further factor is an integer.

3. The method of claim 1, wherein the further factor is at least about three.

4. The method of claim 3, wherein the further factor is at least about five.

5. The method of claim 3, wherein the further factor is an integer.

6. A DC/DC converter circuit having a feedback capability and including a first converter device, the first converter includes at least two inputs which form inputs of the DC/DC converter circuit, and are configured to be connected to a DC voltage source, the DC/DC converter circuit further having a DC-voltage coupled second converter device whose outputs form outputs of the DC/DC converter circuit and are configured to be connected to a DC voltage sink, wherein the second converter device comprises a DC/DC converter cell;
   wherein the first converter circuit includes at least two stages connected in series, wherein the at least two stages are configured to be connected to the DC voltage source via at least one coil.

7. The DC/DC converter circuit of claim 6, wherein the second converter device further comprises at least a second DC/DC converter cell.

8. The DC/DC converter circuit of claim 6, wherein the first converter circuit includes a single stage which is configured to be connected to the DC voltage source via at least one coil.

9. The DC/DC converter circuit of claim 6, wherein both outputs of the first converter circuit are connected directly, without any further component, to the respectively associated input of the second converter circuit.

10. A DC/DC converter circuit having a feedback capability and including a first converter device, the first converter includes at least two inputs which form inputs of the DC/DC converter circuit, and are configured to be connected to a DC voltage source, the DC/DC converter circuit further having a DC-voltage coupled second converter device whose outputs form outputs of the DC/DC converter circuit and are configured to be connected to a DC voltage sink, wherein the second converter device comprises a DC/DC converter cell;
    wherein the first converter circuit includes at least one output connected by an additional coil to an associated input of the second converter circuit.

11. A DC/DC converter cell arrangement having two DC/DC converter cells,
    each of the DC/DC converter cells having at least first, second and third input connections and at least first and second output connections, and further having at least one converter stage having a center point,
    wherein the first input connection is connected to the first output connection, the second input connection is connected to the center point of each of the at least one converter stages and the third input connection is connected to the second output connection;
    wherein each converter stage has an upper series circuit and a lower series circuit which each have at least two power switches (S_ox1, S_ux1, S_ox2, S_ux2) wherein the order number (x) of the respective power switch (S_ox1, S_ux1, S_ox2, S_ux2) is counted from the center point of the at least one converter stage, the last of these upper power switches (S_ox1, S_ox2) is connected to the first input connection and the last of these lower power switches (S_ux1, S_ux2) is connected to the third input connection;
    wherein a capacitor (C_x1, C_x2) is in each case provided in each of the at least one converter stages such that all the upper adjacent power switches are connected to the lower adjacent power switches with the same order number via this respective capacitor;
    wherein at least one of the first input connection and the second input connection, and the second input connection and the third input connection are adapted to receive input from a DC voltage source;
    wherein the third input connection and the second output connection of the first DC/DC converter cell respectively correspond to the first input connection and to the first output connection of the second DC/DC converter cell, and
    wherein the second input connections of the two DC/DC converter cells form the inputs of the converter cell arrangement, and the first output connection of the first converter cell and the second output connection of the second converter cell form the outputs of the DC/DC converter cell arrangement.

* * * * *